April 12, 1966 A. J. PORWIT ET AL 3,245,427
OPERATOR APPARATUS
Filed Aug. 2, 1962 4 Sheets-Sheet 1

INVENTORS
Antoni J. Porwit
George J. Paptzun
BY Strauch, Nolan & Neale
ATTORNEYS INVENTORS
Antoni J. Porwit
George J. Paptzun BY Strauch, Nolan & Neale

ATTORNEYS

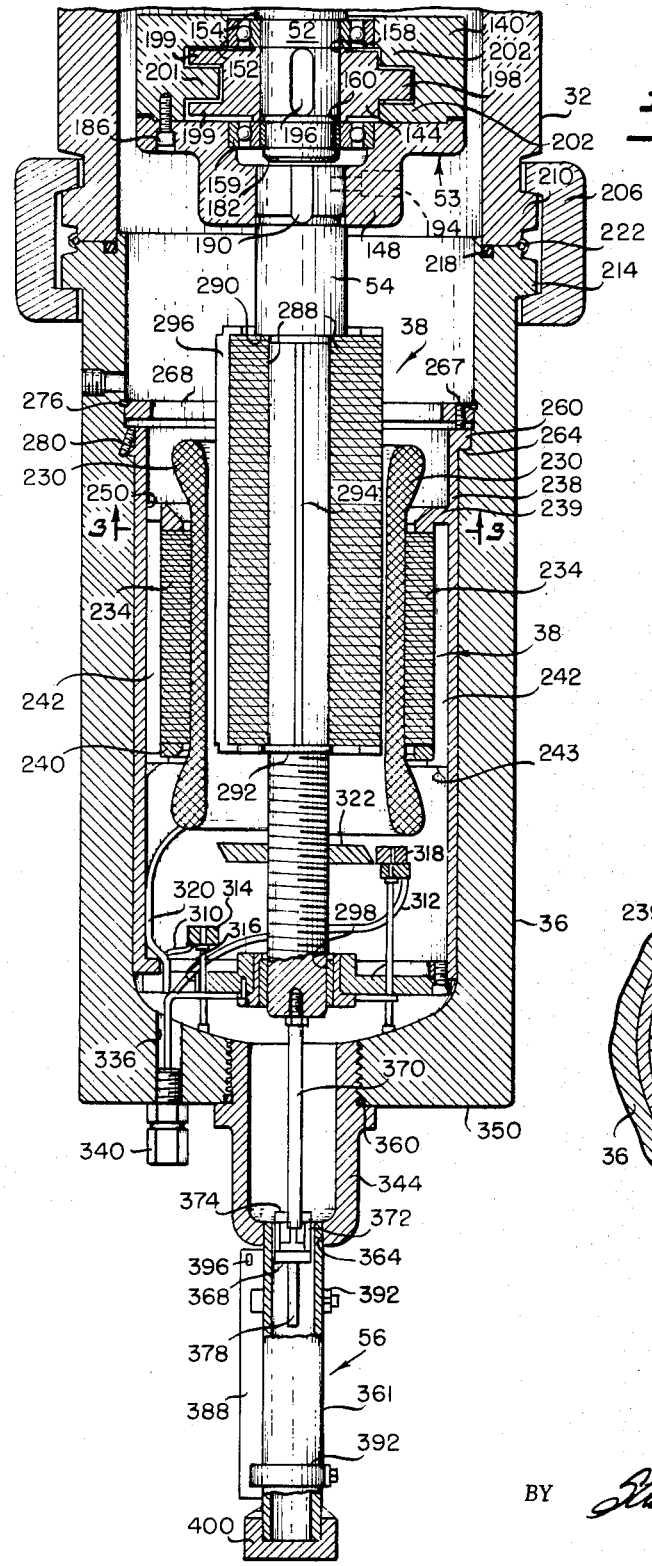
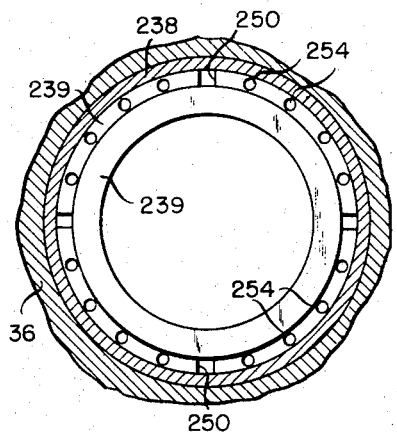

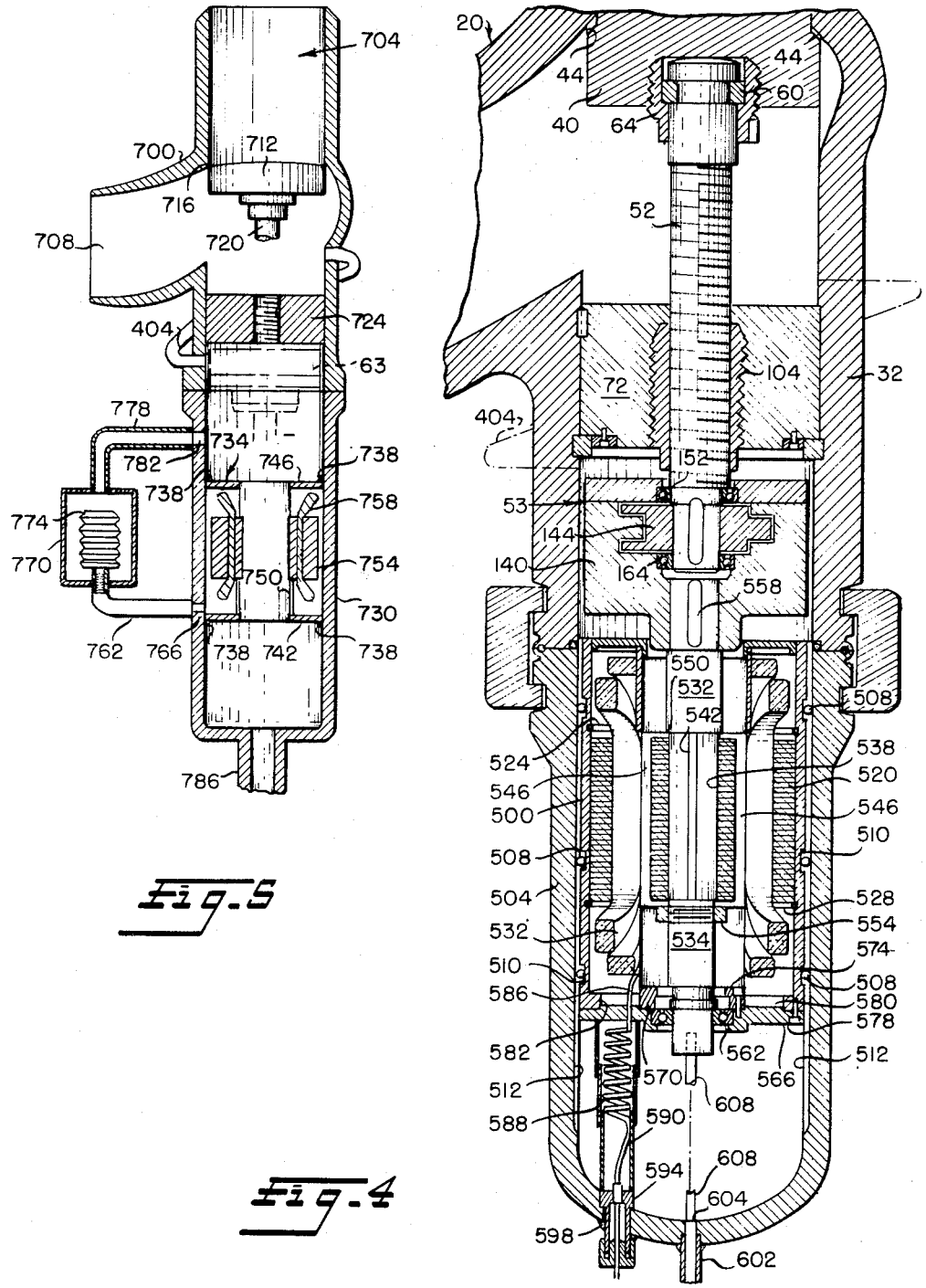

United States Patent Office 3,245,427
Patented Apr. 12, 1966

3,245,427
OPERATOR APPARATUS
Antoni J. Porwit, Calumet City, Ill., and George J. Paptzun, Griffith, Ind., assignors to Edward Valves, Inc., East Chicago, Ill., a corporation of Indiana
Filed Aug. 2, 1962, Ser. No. 214,419
13 Claims. (Cl. 137—339)

This invention relates to operators, and more particularly to hermetically sealed immersed operator devices, especially adapted for use with valves.

Today's technology has developed an urgent need in many fields for valve operator mechanisms which are capable of operating under adverse conditions, for example, submerged in fluid or otherwise subjected to conditions necessitating protection of the operator assembly or protection of the surrounding environment against contamination by escape of fluid in which the valve or other mechanism operates. This invention has wide application in the operation of motors, pumps, the positioning of mechanical control rods in reactors or similar devices. It has particular application to the operation of valves, and the preferred embodiments thereof are accordingly described below in this connection in an immersed valve operator.

An immersed valve operator embodies an electric motor or parts of a motor disposed in a fluid medium adapted to dissipate heat generated during operation of the motor. Of primary importance is the protection of the immersed electric motor windings so that they will not short upon immersion or during operation.

Previously known devices have attempted to prevent shorting by providing a "canned" type motor wherein the motor is hermetically sealed in a container to assure protection of the windings, the "can" being placed between the rotor cavity and stator bore. The primary difficulty with the "canned" type motor has been the very rapid overheating thereof occurring as a result of the extremely slow rate of dissipation of heat. The cooling system in "canned" motors is extremely critical and any failure of the system with power applied to the motor results in almost certain electrical burn-out of the windings. The present invention, in the preferred embodiment thereof, provides an operator which avoids the basic "canned" structure and thereby eliminates these, and other disadvantages. However, in the description of another embodiment of this invention, improvements on "canned" operator constructions will also be disclosed.

The torque required to properly seat and unseat a valve closure member is approximately 12 times that required to drive the valve closure member onto the seat or, once seated, away from the seat. It has therefore been ncessary in prior art devices, to provide a relatively large expensive motor capable of providing sufficient torque to achieve tight seating and unseating of the valve under pressure. In fact, it has been necessary to employ a motor with a substantial reserve capacity with an external impactor (as in the U.S. patent to Karlby, No. 2,992,807), since a motor capable of delivering only the required torque to seat or unseat a valve overheats and is rendered ineffective after brief periods of operation due to inadequate cooling of the enclosed windings.

Briefly the present invention eliminates the above mentioned disadvantages inherent in the prior mechanisms by providing an immersed valve operator capable of substantially improved performance thereby permitting use of a smaller motor with improved heat dissipation and sealing characteristics. This is accomplished by sealing the operator in a completely hermetic container and adapting it to function while preferably totally or partially immersed in the fluid being controlled, or in another fluid when it is necessary to isolate the operator from the controlled fluid, the operator being constructed so that the fluid may circulate freely through it to dissipate heat generated during operation. This eliminates the necessity of valve stem packing or other rotating fluid seals, resulting in reduced operating torque requirements to drive the valve closure member to and from the valve seat, and increased operating speeds. Also, all or a part of the motor in the immersed valve operator is mounted for axial displacement with the valve stem which it actuates. The elimination of frictional resistance which would be otherwise offered by the stem packing increases the operating speed of the valve and in practice permits valve operation in about ½₀ of the time required by conventional operators. This therefore, reduces the amount of heat generated by the motor and the rated capacity necessary, thereby permitting utilization of a relatively small motor in the valve operator.

The internal operator of this invention, being immersed in a fluid, realizes a great reduction in noise over prior external operators. The fluid in which the operator is immersed acts as a very efficient sound insulator. Reduction of noise in operation is an important advantage as is known in this art, since it may permit new operator installations to be made in locations where substantial noise is prohibitive.

In accordance with the present valve operator improvements, motor size requirements are further reduced by providing a connection between the motor and valve closure member whereby driving power from the motor is delivered through a programed impacting sequence in which the motor is repeatedly driven through a forward-reverse cycle to cause a hammer attached to the motor shaft to repeatedly strike an anvil attached to the valve closure member. Transmission of the motor power in this manner in effect increases the motor torque.

To further maintain the operator and its associated valve completely sealed, an indicator is provided which is magnetically responsive to the position of the valve closure member thus avoiding the necessity of providing mechanical connections between the external position indicator and the interior of the immersed valve operator.

Accordingly, it is a primary object of the present invention to provide an operator apparatus requiring a relatively small motor having improved heat dissipation and performance characteristics, and which provides for an easy and rapid operaton of a valve or the like at a fraction of the cost of prior systems.

Another object of the present invention is to provide a valve operator enclosed in a hermetically sealed housing and having a motor with an axially displaceable rotor section adapted to move with the valve closure member.

Another object of the present invention is to provide an immersed valve operator in a hermetically sealed container comprised of a valve body and motor housing, and also to provide novel means for equalizing the pressure between the two.

Another object of the present invention is to provide an immersed valve operator mechanism in which all fluid seals are static, and to further provide an operator mechanism enclosed in a hermetically sealed container interrupted only by static seals and including a motor having an axially displaceable rotor section, and an impacting mechanism operably attached between the motor and valve to deliver to and operate the valve by, impact forces.

Still another object of this invention is to provide an immersed valve operator enclosed in a hermetically sealed container the exterior wall of which is interrupted only by static seals, having a magnetically responsive position indicator located externally of the container for indicating the position of the valve closure member connected with the valve operator.

A further object of the present invention is to provide a novel combination of an immersed valve operator and an impactor assembly for delivering successive and repeated impacts to a valve closure member for operation thereof to thereby reduce the rated capacity previously required for a motor in such valve operators.

A further object of this invention is to provide a motor having an immersed valve operator in which the laminations of the rotor section are longer than the laminations on the stator whereby during the axial displacement of the rotor section in response to movements of the valve stem actuated by the operator, optimum flux coupling for all axial positions of the rotor shaft will be maintained.

Another object is to provide a hermetically sealed stator for an electric motor operator, the stator being provided with a coolant which may be either the fluid being controlled or a different fluid.

Still a further object of the present invention is to provide an electric motor operator for a valve in which fluid may freely circulate to readily dissipate heat generated by said motor.

Other objects and advantages of the present invention will become apparent to those skilled in this art from the appended claims and following description taken in connection with the accompanying drawings illustrating exemplary preferred embodiments of the present invention and wherein:

FIGURE 2B is a vertical section view similar to FIGURE 2A but showing the other portion of the valve and valve operator assembly illustrated in FIGURE 1;

FIGURE 3 is a horizontal section view taken along line 3—3 of FIGURE 2B;

FIGURE 4 illustrates a modified valve and valve operator assembly according to the present invention; and FIGURE 5 is a vertical section view of a valve and valve operator assembly showing another modification of the present invention.

Figure 1:
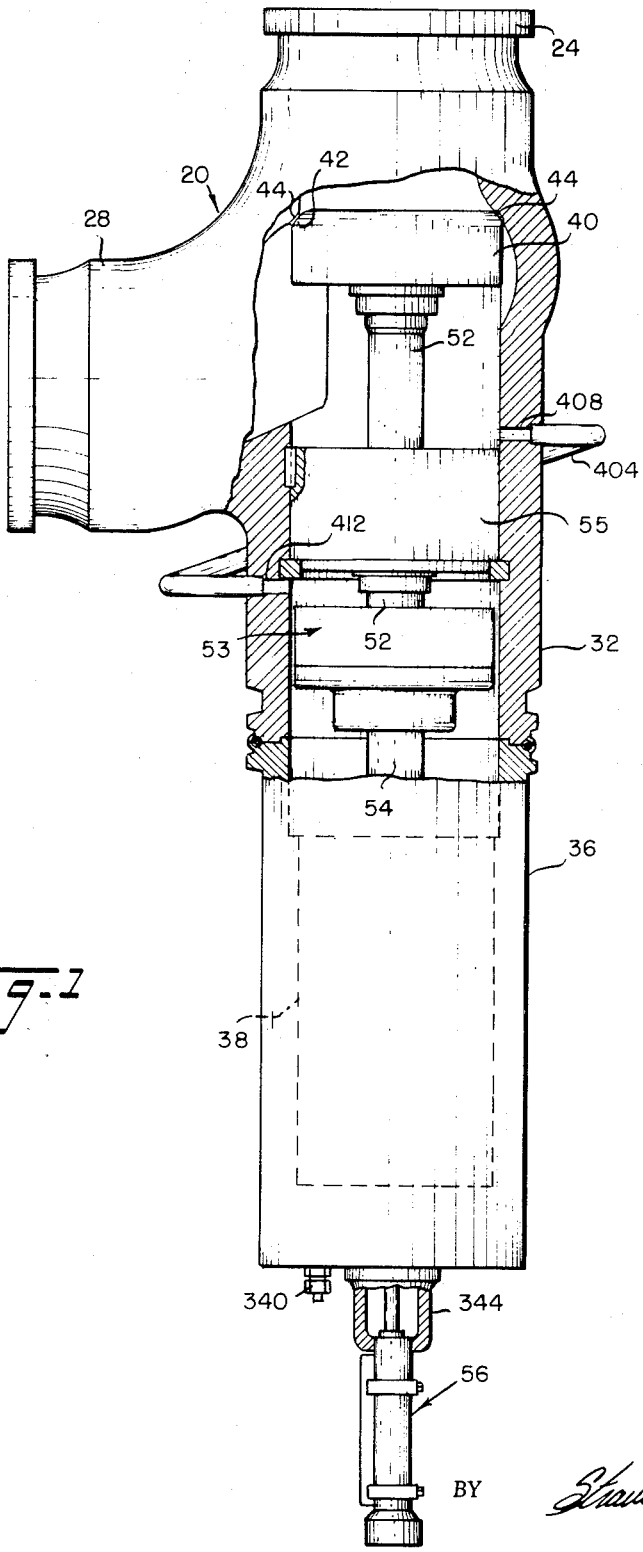
FIGURE 1 is a perspective view with parts broken away and shown in section, of a valve and valve operator assembly embodying the present invention.

Referring now to the drawings, and particularly to FIGURE 1, a valve body of the "angle" type indicated generally as 20 is provided with angularly disposed inlet and outlet connections 24 and 28, respectively, at the terminal ends of a continuous passage through the body. A vertically disposed valve stem receiving boss 32 integral with and extending from valve body 20 is located opposite inlet connection 24 and is substantially coaxial therewith.

The open end of boss 32 is coaxially and sealingly connected to a motor housing 36 which together with boss 32 and valve body 20 comprise a sealed container for the valve operator. Housing 36 is of substantially the same diameter as boss 32 and contains the motor (indicated schematically at 38) of the valve operating assembly assembly adapted to move valve closure member 40 including seating surface 42 toward and away from an annular seating surface 44.

A valve stem 52 rotatably connected to closure member 40 is operably connected with the motor in housing 36 by an impacting mechanism, indicated generally as 53, and rotor shaft 54, and is threadably received in a stationary back seat member 55. The impacting mechanism is adapted to deliver rotative impact blows to the valve stem in a controlled manner to be described, to effect opening and closing movement of closure member 40. The position of valve closure member 40 is shown by an external position indicator referred to generally as 56.

Housing 36 is constructed to be fluid tight and contains the liquid which will dissipate heat generated during operation of the motor contained therein. The housing is therefore preferably mounted below the valve so that fluid in the housing will not tend to drain out due to gravity. It is possible to locate the housing above the valve body as when operating at low system temperatures, about 300° F. or below. However, to insure that the motor chamber will be substantially filled with fluid, a suitable vent should be provided to avoid formation of an air in the motor chamber. Where operating temperatures are above 300° F. it has been found desirable to equip the housing with a suitable cooling jacket to dissipate heat.

It should be understood that the valve operator assembly of the present invention may be adapted to operate any suitable valve. Accordingly, the particular valve body illustrated does not comprise any part of the present invention except insofar as it is combined in the valve operator of the present invention.

Figure 2A:
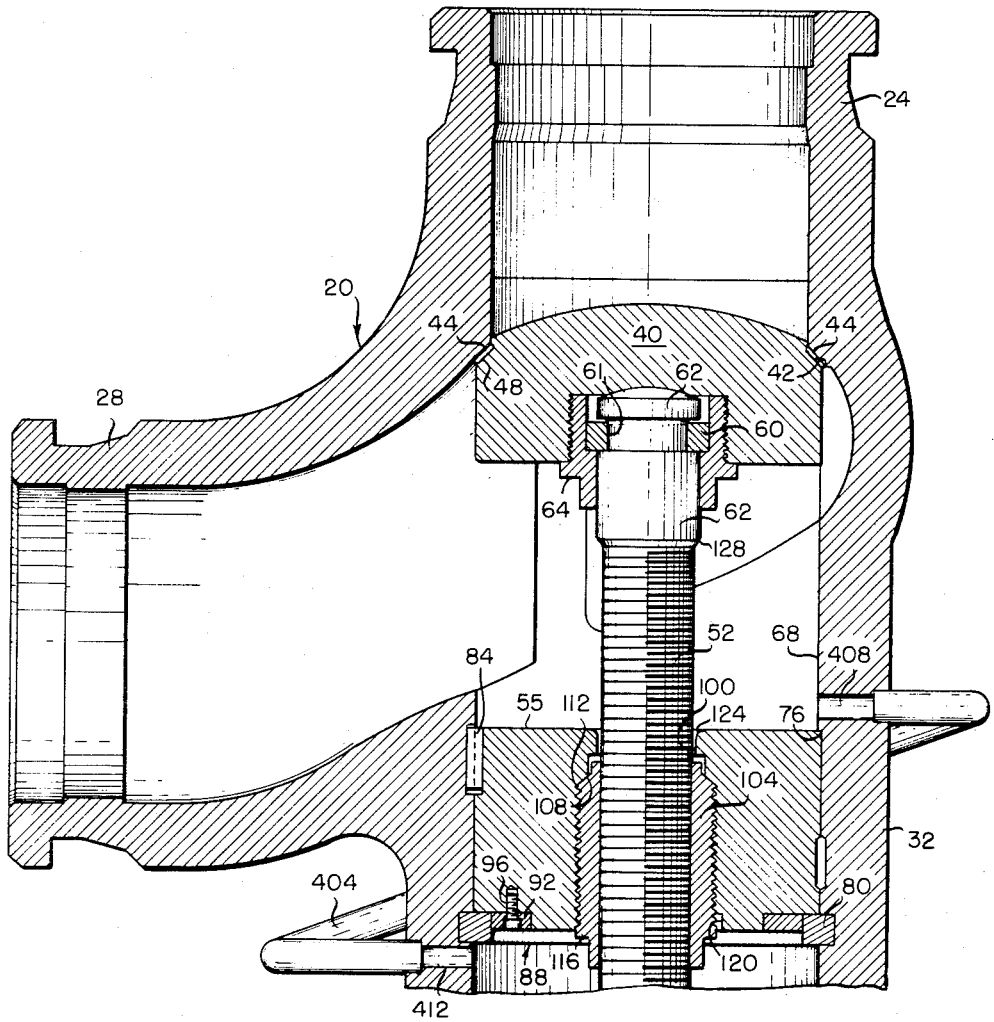
FIGURE 2A is a vertical section view taken approximately through the center and showing a portion of the valve operator and valve illustrated in FIGURE 1, enlarged to show various structural details.

In FIGURE 2A valve body 20 and the valve operator elements immediately associated therewith are shown in more detail. Thus valve stem 52 is attached to valve closure member 40 by a split ring 60 received in a annular groove 61 in the enlarged end section 62 of stem 52, and by nut 64 fixed in a thread bore in valve closure 40. This rotatable connection permits rotation of stem 52 while seating the valve for example, without corresponding rotation of valve closure member 40 relative to valve body 20 to thereby prevent gall of the body and closure member seating face 42.

The central bore 68 of valve stem boss 32 receives back seat 55 between shoulder 76 and a split ring 80 which is received in an annular recess in bore 68. Back seat 55 is non-rotatably secured within bore 68 by a plurality of anti-rotation keys 84 (one shown). An annular retainer plate 92 for retaining spit ring 80 is secured to the back seat by a plurality of bolts 96 (one shown).

Back seat 55 is provided with a central bore 100 to receive an internally and externally threaded valve stem bushing 104. The bushing is threaded into the bore until the conical portion 108 thereof is urged against a frusto-conical seating surface 112.

An annular tapered seating surface 124 is provided on the upper face of back seat 55 at the end of bore 100 engaged by shoulder 128 on stem 52 when the stem and valve closure members are fully withdrawn.

Referring now to FIGURE 2B the impact producing mechanism 53 is adapted to rotate stem 52 in response to controlled rotative movement of rotor shaft 54 effected by energization of motor 38, the threaded engagement of stem 52 with stationary bushing 104 transforming rotation of the stem to longitudinal displacement.

Impacting mechanism 53 is comprised principally of a hammer 140, an anvil member 144 and a hammer plate 148. The hammer 140 is rotatably supported on stem 52 by a ball bearing assembly 152 positioned between stem shoulder 154 and an annular spacing projection 158 extending from one side of anvil 144, and ball bearing 159 positioned in hammer plate 148 and engaging annular projection 160 on anvil 144.

Hammer plate 148 is fastened to hammer 140 by a plurality of spaced bolts 186 (one shown) and is non-rotatably secured to rotor shaft 54 by key members 190. A cap screw 194 prevents relative axial movement of rotor shaft with respect to the hammer plate.

Anvil 144, non-rotatably secured to stem 52 by key 196, is provided with a lug 198 and a pair of lugs 199 diametrically opposite lug 198 and extending radially outwardly into corresponding recesses in hammer 140. Hammer 140 is provided with lugs 201 and 202 which are adapted to strike lugs 198 and 199 respectively upon relative rotation between hammer 140 and anvil 144. The location of lugs 198 and 199 relative to each other prevents unbalanced turning forces from being applied to the anvil. The impact delivered to anvil 144 is transmitted through key 196 to stem 52 and consequently effects operation of valve closure member 40.

By employing the impacting mechanism, the size of the motor required to obtain a large valve seating torque to effectively seat the valve, is considerably reduced.

Motor 38 is adapted to drive stem 52 in a selected direction by being controlled to deliver repeated and successive impacts in the same direction. This is accomplished in accordance with this invention by providing a motor control circuit (not shown) which automatically reverses the power phases of the electric motor so as to reverse the rotation of the rotor shaft at predetermined intervals. One such suitable motor and control circuit is shown and described in U.S. Patent No. 2,992,807 to H. Karlby et al. and reference is hereby made to said patent for a complete and detailed description of a suitable motor and motor control circuit for use in this invention.

Motor housing 36 is attached to boss 32 by means of a yoke lock ring 206, which engages suitable flanges 210 and 214 on the valve stem receiving boss and motor housing respectively. An O-ring 218 provides a temporary and low temperature static fluid tight seal between motor housing 36 and boss 32. For permanent high temperature service, the motor housing and boss inner faces are further sealed against fluid leakage by a weld deposit 222 provided at the outer periphery of the joint created therebetween.

As shown in FIGURE 2B, stator windings 230 and stator laminations 234 are supported in housing 36 by a cylindrical stator shell 238 which serves as a motor support. The stator laminations are closely packed between an inner annular flange 239 extending from shell 238, and a support ring 240. Ribs 242 secured in shell 238 as by welds 243, engage and retain support ring 240 in place. The stator shell 238 is provided with a plurality of vertical openings around the outer periphery thereof to permit free flow of fluid or coolant about the motor windings and laminations. This is more clearly illustrated in FIGURE 3 wherein a plurality of channels 250 and apertures 254 are provided in flange 239 to provide access for the flow of the fluid therethrough.

Motor support shell 238 terminates at its upper extremity in a flat outwardly extending flange 260 which is urged into engagement with shoulder 264 on the interior wall of motor housing 36, by a plurality of screws 267 (one shown in FIGURE 2B) carried by a lock ring 268 retained in motor chamber 36 by split ring 276 matingly received within a suitable recess provided in the motor housing interior wall.

Circumferentially spaced pins 280 (one shown in FIGURE 2B) extend through flange 260 of motor support shell 238, and are threaded into motor housing wall 36 to non-rotatably orient motor support shell 238 relative to housing 36.

Rotor laminations 288 are telescoped over axially movable rotor shaft 54 and vertically positioned thereon by shoulder 290 and a suitable ring member 292 fixed to shaft 54. An elongated key 294 received in a longitudinal groove in the shaft non-rotatably secures the laminations 288 to shaft 54. Cast rotor bars 296 of electrically conductive material are provided at spaced intervals about the outer periphery of rotor laminations 288 in contact therewith. The lower end of rotor shaft 54 is supported in journal bearing 298 carried by a housing member 308 attached to the stator shell 238. The length of laminations 288 being greater than the length of laminations 234 by a distance at least equal to length of valve travel so that maximum flux coupling is maintained during axial movement of the rotor shaft.

The aforementioned control circuit of Patent No. 2,992,807 is connected to the field winding 230 by a lead 320 extending through a sealed gland 340 and an opening 336 in the bearing support member 308. Also extending through the gland 340 are leads 310 and 312 connected to limit switches 314 and 318 adjustably carried by the bearing support member 308 in position to be actuated by a collar 322 adjustably carried by the movable rotor shaft 54 when the valve reaches fully open or fully closed positions to de-energize the motor circuit as more fully explained in the aforementioned Patent No. 2,992,807.

Indicator cap 344 is threaded to housing 36. An O-ring 360 seals the connection of cap 344 and housing 36, for temporary service, while welding is preferred for permanent service.

Position indicator tubular housing 361 is received in cap 344 within bore 364 which is sealed by a weld or other suitable means around the housing. A magnet 368 is fixed to the end of magnet support cage 372 which in turn is rotatably attached to indicator rod 370 by bearings 374. Magnet 368 and support cage 372 are held against rotation in housing 361 by guide 378 or by any other suitable means.

Indicator rod 370 is fixed to the end of rotor shaft 54 and thereby transmits axial movement of the rotor shaft to magnet 368. A suitable indicator 388 graduated along its length as desired is clamped to position indicator housing 361 by clamps 392. A magnetically attractable element 396 is adapted to slide freely in a groove or slot indicator 388 so as to be vertically positioned correspondingly with magnet 368 and thereby indicate the position of valve closure member 40. The position indicator 56 is sealed at the end thereof by conventional cap 400.

In operation of the valve from its closed position as illustrated in FIGURES 2A and 2B the "open" switch is connected to the motor timing device (not shown) and suitable electrical power source. This switch energizes the pre-programed timing device which in turn controls the electric motor of the valve operator.

Upon energization of the motor, rotor shaft 54 is caused to rotate in a counterclockwise direction for a fraction of a second. The timing mechanism is programed such that on opening of the valve, for example, power is maintained for a very small period after the actual impact of hammer lugs 201 and 202 against anvil lugs 198 and 199 to prevent the "bounce" that would otherwise occur. The timing mechanism then directs a reversal of rotation of the rotor shaft to withdraw the hammer a sufficient distance from the anvil to allow an effective impact upon successive counterclockwise cycles to rotate the valve stem to thereby move the valve stem axially.

Longitudinal displacement of valve stem 52 as described will result in a longitudinal displacement of impacting mechanism 53, rotor shaft 54, rotor laminations 288 and rotor bars 296.

The windings in the electric motor are preferably coated with a polyvinyl chloride or other suitable material to prevent any deleterious effects the line fluid might have. Other coatings may be employed to raise the effective operating temperature of the motor as desired, for example polyvinyl chloride has a temperature limitation of approximately 200° F. whereas low pressure polyethylene may be used to raise the temperature limitation to approximately 250° F. Tests of valves with an external tube 404 have been conducted where water at approximately 700° F. was being controlled, and it was found that the motor chamber temperature did not exceed 170° F. for one complete opening and closing of the valve.

The liquid coolant circulated around the motor may be any conventional coolant compatible with the motor, or it may be the fluid controlled by the valve if desired. Heat generated by the motor is dissipated through the medium of the coolant fluid to shell 36 of the motor chamber and then to surrounding atmosphere. Shell 36 is not insulated so that heat exchange to atmosphere is relatively free. The pressure differential between the valve body and motor housing interior is substantially eliminated by a pressure equalizing tube 404 as illustrated in FIGURES 1 and 2A.

Tube 404 interconnects two apertures 408 and 412 drilled through the wall of boss 32. Aperture 408 is located in the wall of boss 32 at a position above the surface of back seat 55 and provides an opening from central bore 68 to atmosphere. Aperture 412 is provided at a position on the other side of back seat 55 and likewise provides access from the interior of boss 32 to atmosphere. Tube 404 is sealingly secured over the outer terminal of apertures 408 and 412 (preferably by welding or the like) to provide a fluid tight connection between the section of the valve body enclosing valve closure 40 and the portion of boss 32 surrounding impacting mechanism 53 and connected to the motor housing.

When valve closure member is driven from a fully open to a fully closed position the volume of stem 54 displaced from back seat 55 will create a pressure differential between motor housing 36 and valve body 20. This pressure differential is equalized by tube 404 interconnecting the spaces on opposite sides of back seat 55 and discharging the relatively cool fluid contained therein to the low pressure side. Tube 404 is located externally of valve body 20 and housing 36 so that fluid contained therein will be cooled by environmental conditions. Its volumetric capacity is preferably equal to or greater than the volume of fluid necessary to equalize the pressure differential caused by displacement of stem 54 on closing the valve.

If desired, a pressure equalizing means may be provided by boring a direct access passage through back seat 55. However, this construction would not afford the cooling effect provided by the external tube 404 and, in the event hot fluid is being controlled by valve 20, undesirably hot fluid would be introduced into the motor chamber raising the temperature of the fluid in the motor chamber.

In FIGURES 1, 2A and 2B as discussed above, the motor size reduction and consequent reduction in the amount of heat generated during operation of the valve is largely due to the great reduction in torque requirements resulting from elimination of the necessity of rotating stem seals and the provision of an impact delivering stem operating mechanism. In another embodiment of this invention embodying these principles, a valve operator and valve are shown in FIGURE 4, but the entire electric motor is axially movable to achieve axial rotor displacement. To the extent this embodiment is similar to the preferred embodiment illustrated in FIGURES 1, 2A and 2B, like reference numerals are used to designate like parts and will not be described again, and new reference numerals are used to illustrate various details of the modified electric motor and electric motor mounting.

FIGURE 4 illustrates a substantially cylindrical stator shell 500 mounted in motor housing 504 by means of a plurality of rollers or bearings 508 received in notches 510. Longitudinal guide recesses 512 are cut in the inner wall of housing 504 for receiving bearings 508. Relatively free guided longitudinal movement is obtained due to the relation of bearings 508, notches 510, and guide recesses 512 which also lock the stator shell against rotation. Stator laminations 520 are secured to the inner wall of stator shell 500 at one end thereof by snap ring 524 which is received in an annular recess along the inner wall of shell 500, and at the other end thereof by a snap ring 528 also received in a recess in the inner wall of shell 500. Windings 532 are positioned around the stator laminations in a well known manner.

On rotor shaft 534, rotor laminations 538 are non-rotatably keyed by key element 542. The vertical location of the laminations is maintained by rotor bars 546 which have inwardly directed opposite end portions that engage rotor shaft shoulder 550, and retainer nut 554 threadedly fixed on shaft 534. If desired, a set screw may be inserted in retainer 554 to insure that it maintains its place.

Rotor shaft 534 is keyed by key 558 to the combined hammer and hammer plate element 140. At its other end it is journalled in bearing 562 received and retained in position in stator shell end plate 566 by retainer plate 570 bolted to end plate 566 as by a plurality of bolts 574 (only one of which is shown in FIGURE 4). Plate 566 is secured to stator shell 500 by a plurality of bolts 578 (only one of which is shown in FIGURE 4) which extend into a flanged shell end section 580. An opening 582 is provided on one side of plate 566 and permits passage of wire 586 to the electric motor in a well known manner. Between end plate 566 and the end of housing 504 wire 586 has a coiled section 588 so as to be longitudinally expansible as illustrated in FIGURE 4. Wire coiled section 588 is received in a flexible or telescopingly expandable tube 590 which abuts the exterior side of wall 566 at one end; at the other end thereof a suitable wire gland 594 extends through the end of housing 504 and is adapted to admit wire 586 in a sealed manner into the housing. To insure sealing the gland is preferably welded as at 598.

A valve closure member positioning indicator housing 602 welded or otherwise sealingly secured to housing 504 is provided at the end of the housing in communication with aperture 604. Indicator rod 608 threadably secured to shaft 534 passes through aperture 604 and into housing 602 and is suitably secured to a sealed magnetic indicating means similar to that described in connection with the embodiment of FIGURES 1, 2A and 2B.

In the operation of this embodiment maximum flux coupling of the electric motor is maintained at all times since the rotor shaft does not move relative to the stator section of the electric motor. Upon energization of the motor rotative movement is imparted to shaft 534 and transmitted by key 558 to hammer 140 which thereby transmits the force to hammer 144 and consequently effects rotation of stem shaft 52 in bushing 104. As the valve stem is displaced longitudinally it accordingly effects longitudinal displacement of the impacting mechanism 54 and of motor rotor shaft 534 which effects longitudinal displacement of stator shell 500 riding on bearings 508 in slots 512.

It may be desirable to utilize a pressure-equalizer tube 404 similar to that illustrated in FIGURE 1 and such is shown diagrammatically by dotted line 404 in FIGURE 4. It may also be desirable to utilize a cooling jacket with this or the other embodiments of this invention. This may be done by enclosing the motor housing in any suitable type of heat transfer jacket in which a coolant fluid may be located and circulated if desired. The line fluid being controlled by valve 20 is not necessarily isolated from the motor or motor housing since the windings are preferably coated with a suitable resistant material.

Where contaminated fluids are controlled and present coating materials are not sufficiently resistant or completely satisfactory to prevent or retard deterioration due to such fluids, a motor having coated windings might therefore be unsatisfactory for such service. Accordingly, in another embodiment of this invention a canned type motor is illustrated in FIGURE 5 having motor windings and stator laminations sealed against line fluid contact.

The arrangement of the embodiment of FIGURE 5 is essentially the same as that for the embodiment shown in FIGURES 1–4 in that a valve body 700 having an inlet passage 704 and an outlet passage 708 is illustrated being controlled by a valve closure member 712 which as shown engages valve seat 716. A valve stem 720 is rotatably connected to closure member 712 and extends through back seat member 724 into and connects with an impacting mechanism and rotor shaft (not shown) as described in connection with FIGURES 1–4.

A motor housing 730 has secured therein a "can" 734 which may be welded to the inner wall of housing 730 as at 738. The can has a bottom wall 742, a top wall 746 and a substantially cylindrical inner wall 750 interconnecting end wall 742 and 746 and forming with the interior wall of housing 730 and the bottom and top walls 742 and 746 respectively a sealed container for stator laminations 754 and windings 758. A coolant fluid is contained in can 734 circulating about windings 758 from the tube 762 which communicates with the interior of can 734 through an aperture 766 in housing 730. The tube 762 extends into a pressure equalization chamber 770 and terminates in a flexible bellows type fluid container 774.

Extending through the other end of pressure equalization chamber 770 is tube 778 which is in communication with the interior of housing 730 through aperture 782. The connections of tubes 762 and 778 with apertures 766 and 782 are respectively sealed.

During operation pressure differential between the interior of can 734 and the interior of motor housing 730 will result in a corresponding shift of coolant fluid from the bellows reservoir 774 into or out of can 734. Pressure equalizer 404 is also provided to eliminate pressure differential on opposite sides of back seat 724 during valve operation.

The rotor shaft may be axially displaceable in this embodiment relative to the stator laminations similarly as in the embodiment disclosed and described in connection with FIGURES 1, 2A and 2B. An indicator housing is shown schematically at 786 and may be connected to the axially displaceable rotor shaft as described in connection with the embodiment illustrated in FIGURES 1, 2A and 2B.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In combination with a valve having a movable valve closure member and a valve stem connected to said valve closure member, operator apparatus comprising:
    (a) a reversibly operable motor means comprised of a stator and rotor,
    (b) means coupling said stem with said motor means for transmitting impact energy delivered by said motor means to said stem,
    (c) control means for automatically repeatedly reversing the direction of operation of said motor means to impart successive and repeated drive impacts to said stem in a selected direction, and
    (d) a sealed housing having flow line inlet and outlet openings completely enclosing said motor means, valve stem, coupling means and closure member.

2. In combination with a valve having a valve stem and a movable valve closure member operably connected therewith, operator apparatus comprising:
    (a) a housing member sealingly connected with said valve adapted to contain the fluid passing through said valve,
    (b) motor means in said housing comprised of a stator means and an axially displaceable rotor means, each being adapted to be immersed in said fluid,
    (c) connecting means adapting said motor means to effect movement of said closure member by operably connecting said motor means to said valve stem.

3. In combination with a valve having a valve stem and a movable valve closure member operably connected therewith, operator apparatus comprising:
    (a) a substantially fluid tight housing member sealingly connected to said valve adapted to contain the fluid passing through said valve,
    (b) motor means in said housing comprised of a stator and axially displaceable rotor, each adapted to be immersed in said fluid;
    (c) means for mounting said motor means in said housing, and
    (d) connecting means adapting said motor means to effect movement of said closure member upon being energized by operably connecting said motor means to said valve stem, said connecting means comprised of impact means for transmitting the delivered energy of said motor to said valve stem by impact.

4. Operator apparatus as defined in claim 3, wherein said motor means further comprises a control circuit regulating said motor means so that said impact means is driven repeatedly and successively in the same direction for a predetermined period.

5. Operator apparatus as defined in claim 3, wherein said rotor means comprises a rotatable shaft having laminations secured thereto, said shaft being secured to said connecting means at one end thereof and journalled for rotative and longitudinal displacement in said housing at its other end whereby said rotor is adapted to move longitudinally in said housing relative to said stator.

6. An operator as defined in claim 3, wherein said connecting means further comprises a seat member receiving said valve stem and transmitting at least part of said impact forces applied to stem into forces effecting displacement of said valve stem substantially along its longitudinal axis.

7. In combination with a valve having a valve and a valve closure member operably connected therewith, a valve operator apparatus having only static fluid seals therein comprising:
    (a) a fluid tight housing sealingly secured to said valve adapted to contain the fluid being controlled by said valve,
    (b) electric motor means in said housing comprised of a stator means and an axially displaceable rotatable rotor means, said motor means being provided with means for protecting it from the fluid being controlled by said valve,
    (c) means connecting said rotor means and said valve stem comprising impact means for delivery of the output energy of said motor by impact to said valve stem, and
    (e) means in said housing for dissipating heat generated by operation of said motor means.

8. The combination as defined in claim 7 further comprising:
    (f) position indicating means comprised of a magnetized movable indicator positioned externally of said housing, and
    (g) means located inside said apparatus operably connected with, and mounted in said apparatus to move in response to movements of said valve closure member and being magnetically coupled with said position indicator whereby movements of said valve closure internally of said apparatus are indicated externally thereof without use of a fluid seal about relative moving parts.

9. The combination as defined in claim 7, wherein said motor mounting means in said housing comprises a substantially cylindrical mounting member having support means provided therein for supporting said stator means.

10. The combination as defined in claim 7, wherein said heat dissipating means is coolant liquid,
    (h) and said apparatus further comprising means placing said valve and said housing in fluid communication.

11. The combination defined in claim 10, wherein said means placing said housing and valve in fluid communication is a conduit located exteriorly of said apparatus.

12. The combination as defined in claim 11 wherein said conduit is capable of containing a volume of said liquid sufficient to accommodate the change in volume in said housing created by closing or opening said valve.

13. In combination with the valve having a body provided with a main flow passage and a stem operated valve closure member adapted to open or close said passage, operator apparatus for moving said stem and said closure member comprising:

(a) a substantially fluid tight housing member rigid with said valve body and adapted to contain the fluid passing through said valve,
(b) motor means mounted in said housing comprising a stator and a rotor, each adapted to be immersed in said fluid,
(c) connecting means operably connecting said motor means to said valve stem to move said stem to thereby open and close said valve, said connecting means comprised of impact means for transmitting the delivered energy of said motor to said valve stem by impact, the movement of said stem changing the effective volume of said housing,
(d) and a conduit connecting said main flow passage with the interior of said housing and having a body portion extending externally of said body and said housing, said external portion of said conduit being of sufficient size to contain a volume of said fluid sufficient to accommodate the change in effective volume in said housing created by movement of said stem incident to closing or opening said valve.

References Cited by the Examiner

UNITED STATES PATENTS

| | | | |
|---|---|---|---|
| 1,772,719 | 8/1930 | Johnson | 310—209 X |
| 2,295,404 | 9/1942 | Johns | 310—86 |
| 2,939,399 | 6/1960 | Rutschi | 310—86 X |
| 2,941,476 | 6/1960 | Pezzillo | 310—86 X |
| 2,956,188 | 10/1960 | White | 251—133 X |
| 2,959,694 | 11/1960 | Hutson | 310—191 X |
| 2,992,807 | 7/1961 | Karlby | 251—76 |

M. CARY NELSON, *Primary Examiner.*